United States Patent [19]

Schwob

[11] 4,296,560
[45] Oct. 27, 1981

[54] WATER INJECTION DEVICE FOR A STEAM IRON

[75] Inventor: Pierre Schwob, Lyons, France

[73] Assignee: SEB S.A., Selongey, France

[21] Appl. No.: 116,810

[22] Filed: Jan. 30, 1980

[30] Foreign Application Priority Data

Feb. 13, 1979 [FR] France .................. 79 03622

[51] Int. Cl.³ .................. D06F 75/06; D06F 75/18
[52] U.S. Cl. .................. 38/77.81; 38/77.83
[58] Field of Search .................. 38/77.1–77.9; 219/271, 273

[56] References Cited

U.S. PATENT DOCUMENTS

| 2,313,382 | 3/1943 | Kistner | 38/77.83 |
| 3,103,079 | 9/1963 | Bricker et al. | 38/77.81 |

FOREIGN PATENT DOCUMENTS

| 1159368 | 6/1958 | France | 38/77.81 |
| 355761 | 9/1961 | Switzerland | 38/77.81 |

*Primary Examiner*—Louis Rimrodt
*Attorney, Agent, or Firm*—Young & Thompson

[57] ABSTRACT

The water injection device for a steam iron comprises a plunger which is capable of axial displacement over a predetermined range of travel within the orifice of a nozzle which is formed of elastic material and closely encircles the plunger. The nozzle orifice provides a communication between a water reservoir and a vaporization chamber. A longitudinal groove is formed along part of the length of the plunger. The range of travel of the plunger is such that the two ends of the groove are located on each side of the nozzle orifice in the injection position and are located on one side of the orifice in the closed position.

8 Claims, 14 Drawing Figures

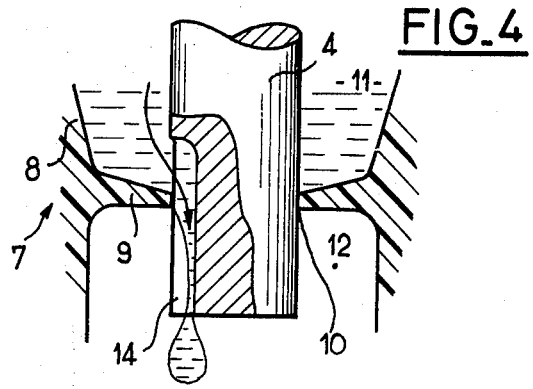
FIG.4
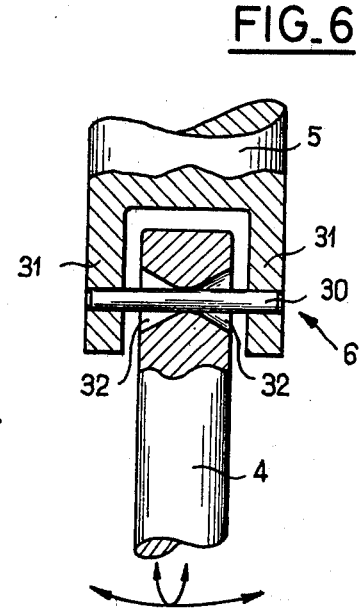
FIG.6
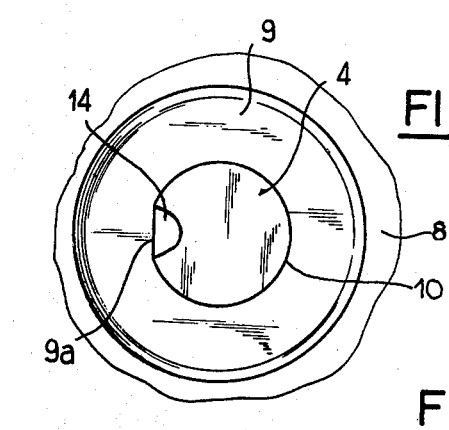
FIG.5
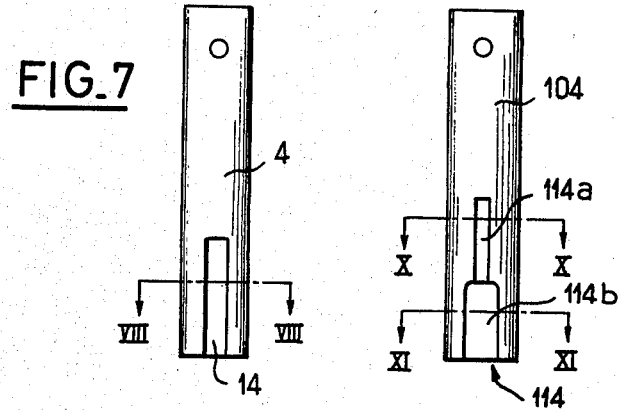
FIG.7 FIG.9 FIG.12
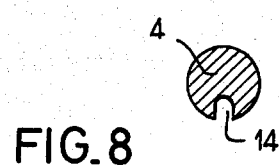
FIG.8
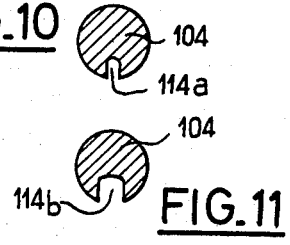
FIG.10
FIG.11
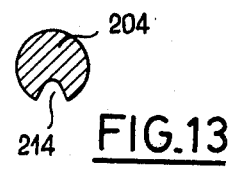
FIG.13

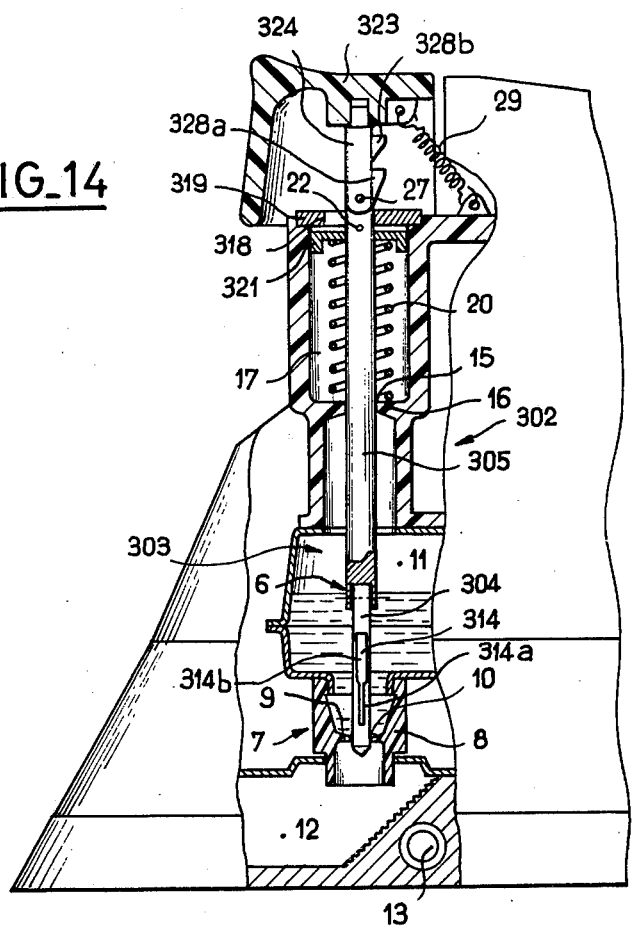

WATER INJECTION DEVICE FOR A STEAM IRON

This invention relates to a device for injecting water into the vaporization chamber of a steam iron at a predetermined rate of flow.

The invention is further concerned with a steam iron equipped with said device.

Injection devices of this type comprise control means for shutting-off or freeing a passage through which water is fed drop by drop from a reservoir to a vaporization chamber, usually under the action of gravity, then discharged from the vaporization chamber in the form of steam through ducts formed in the sole-plate of the iron.

In a known form of construction, a device of this type is constituted by a plunger of generally cylindrical shape which is capable of axial displacement in order to penetrate into and withdraw from a nozzle formed of elastic material. Depending on its position, the plunger either prevents or permits the flow of water through the nozzle orifice towards the vaporization chamber.

A known device of this type is subject to a number of drawbacks. For example, provision has to be made for a nozzle having a very small diameter in order to permit a drop-by-drop flow of water, with the result that the plunger must have a corresponding diameter and is therefore a delicate component. Furthermore, each time the user actuates the plunger, he causes it to withdraw from and return into the nozzle of elastic material, thus applying a high stress to the nozzle which operates at a relatively high temperature. In consequence, the nozzle orifice eventually becomes larger. In addition, the plunger must be guided with a high degree of accuracy in order that it may be permitted to return into the nozzle after having passed out of this latter, thus imposing a heavy cost penalty from the production standpoint. The nozzle orifice must in any case be designed in the shape of a funnel in order to cooperate in the guiding action referred-to above. This funnel shape as well as the high stresses to which the nozzle is subjected entail the need for a substantial wall thickness, with the result that the nozzle has a low degree of flexibility and readily becomes incrusted with scale.

In another known form of construction, an injection device of this type comprises a plunger consisting of a hollow rod continuously engaged within a nozzle provided with a recess. Thus the plunger is capable of rotational displacement about its axis in order to permit or to prevent the flow of water, depending on whether a lateral port of the plunger at the level of the nozzle is located opposite to the recess or not.

The known device just mentioned has a disadvantage in that scale is readily formed. The reason for this lies in the fact that the nozzle does not accompany the movement of rotation of the plunger and also has a sufficient wall thickness to be capable of masking the port in the closed position. In consequence, the nozzle is not subjected to any elastic deformation and is thus conducive to the deposition of scale.

The aim of the present invention is to overcome the disadvantages discussed in the foregoing by providing a device of rugged design which is both reliable and inexpensive to produce.

the invention is accordingly directed to a water injection device for a steam iron in which a plunger is capable of axial displacement over a predetermined range of travel within the orifice of a nozzle which is formed of elastic material and adapted to encircle the plunger in closely fitting relation thereto. The nozzle orifice is substantially coaxial with the plunger and provides a communication between a water reservoir and a vaporization chamber. A longitudinal groove is formed along part of the length of the plunger, the range of travel of the plunger being such that the two ends of the groove are located on each side of the orifice in a first end position and that the two ends of the groove are located on one side of said orifice in a second end position.

According to the invention, the nozzle essentially comprises an annular portion of elastic material, a thin lip being formed on the internal wall of said annular portion in order to delimit the orifice of said nozzle.

Thus in the first end position or injection position, the water flows through the nozzle along the groove and is subsequently fed drop by drop from the water reservoir to the vaporization chamber. In the other end position or closed position, the plunger cooperates with the thin lip in order to obturate the nozzle and prevent any further flow of water.

Since the plunger never passes out of the nozzle, it therefore proves a particularly simple matter to solve any problems arising from the need to guide the plunger. Furthermore, since the plunger moves in the axial direction, the nozzle of elastic material undergoes flexural deformation as a result of this movement and there is therefore a lower risk of scale formation. It should further be noted that the thin lip is very flexible and consequently not readily subject to scale formation. The lip is therefore capable of ensuring good leak-tightness around the plunger even if this latter is not perfectly coaxial with the orifice. By virtue of the annular portion, operations involving assembly and fixing of the nozzle can be performed without difficulty.

In a preferred embodiment of the invention, the plunger is constituted by two portions which are pivotally coupled together by means of a knuckle-joint assembly.

By means of the arrangement just mentioned, the problem involved in guiding of the plunger is further simplified. In point of fact, since the lip which delimits the nozzle orifice is of small thickness, that portion of the plunger which cooperates with the lip can always be introduced into the nozzle orifice at the time of assembly when set at a certain angle at the level of the knuckle-joint assembly, even if the other portion of the plunger exhibits relatively substantial misalignment with respect to said orifice. Furthermore, in the event of wear of that portion of the plunger which cooperates with the nozzle, it may be considered sufficient to replace that portion of the plunger only.

Further distinctive features and advantages of the present invention will become apparent from the following description, reference being had to the accompanying drawings which are given by way of example and not in any limiting sense, and in which:

FIG. 4 is a sectional view of the nozzle and of the plunger, this view being taken along line IV—IV of FIG. 3;

FIG. 5 is a plan view of the nozzle and of the plunger;

FIG. 6 is a fragmentary sectional view of the plunger at the level of the articulation of the two constituent portions of said plunger;

FIG. 7 is a view of a first form of construction of the lower portion of the plunger;

FIG. 8 is a sectional view taken along line VIII—VIII of FIG. 7 showing the lower portion of the plunger in its first form of construction;

FIG. 9 is a view of a second form of construction of the lower portion of the plunger;

FIG. 10 is a sectional view along line X—X of FIG. 9 showing the lower portion of the plunger in its second form of construction;

FIG. 11 is a sectional view taken along line XI—XI of FIG. 9 showing the lower portion of the plunger in its second form of construction;

FIG. 12 is a view of a third form of construction of the lower portion of the plunger;

FIG. 13 is a sectional view taken along line XIII—XIII of FIG. 12 showing the lower portion of the plunger in its third form of construction;

FIG. 14 is a cutaway view in side elevation showing a steam iron equipped with a water injection device according to an alternative embodiment of the invention, the device being shown in the closed position.

Figure 1:
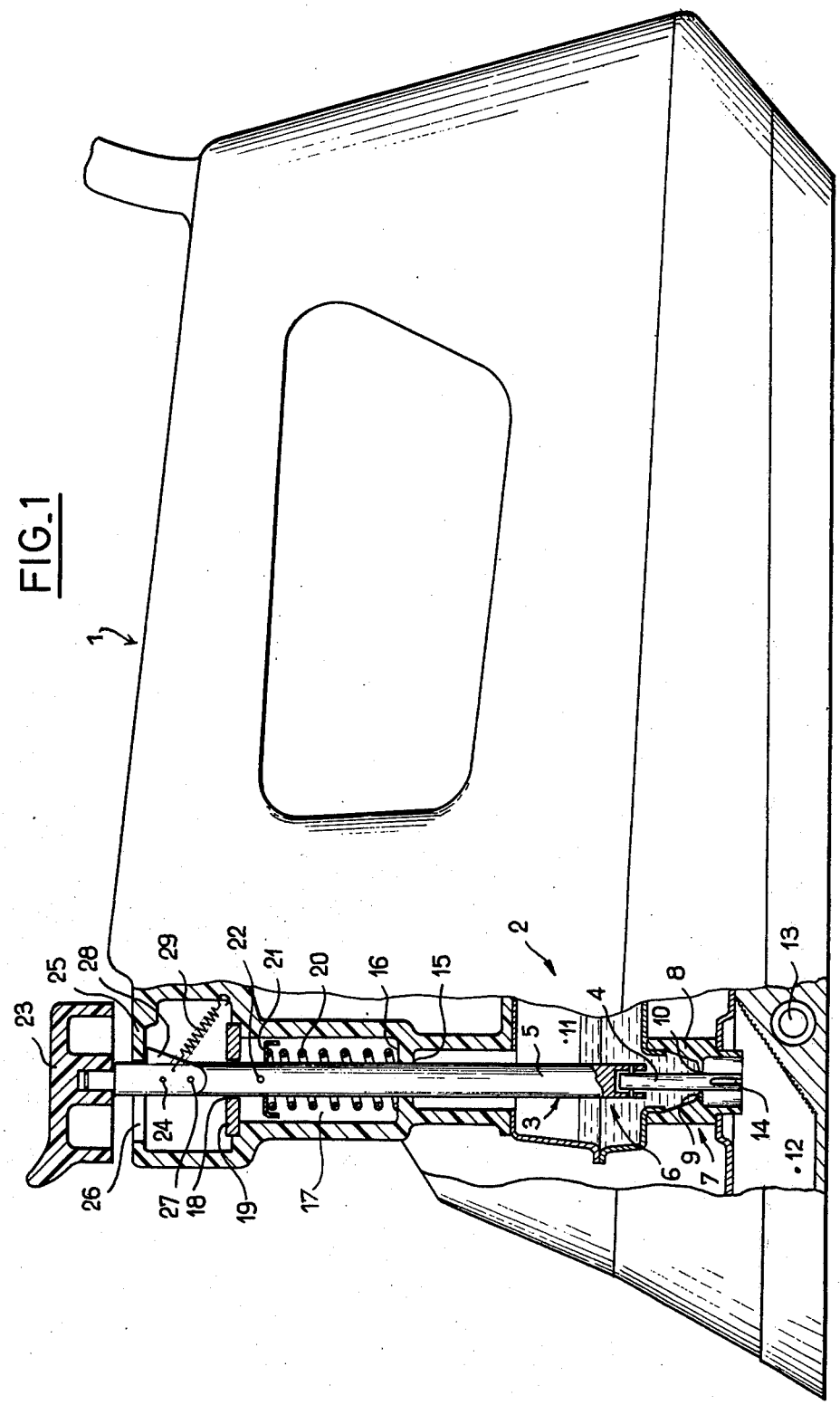
FIG. 1 is a cutaway view in side elevation showing a steam iron equipped with the water injection device in the closed position.
Figure 2:
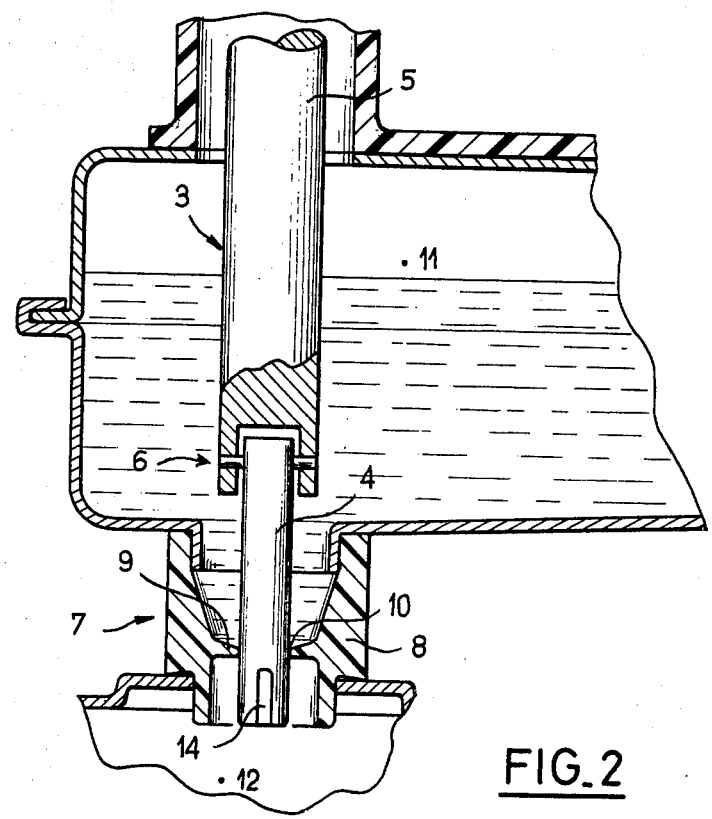
FIG. 2 is a view to a larger scale showing the nozzle and the plunger of FIG. 1.

Referring to FIGS. 1 and 2, a steam iron 1 comprises a water injection device 2. This device comprises an injection plunger 3 constituted by a pintle 4 formed of polytetrafluoroethylene and by a push-rod 5 formed of polypropylene. Thus only the pintle 4 is made of costly material which affords resistance both to scale formation and to high temperatures. The pintle 4 and the push-rod 5 are coupled together by means of an articulation 6.

A nozzle 7 of silicone resin comprises an annular portion 8 and a thin lip 9 formed on the internal wall of said annular portion 8. Said lip 9 determines an orifice 10 which is substantially coaxial with the pintle 4 and encircles this latter in closely fitting relation. The orifice 10 establishes a communication between a water reservoir 11 and a vaporization chamber 12 located in close proximity to an electric resistor 13 for heating the iron 1.

Figure 3:
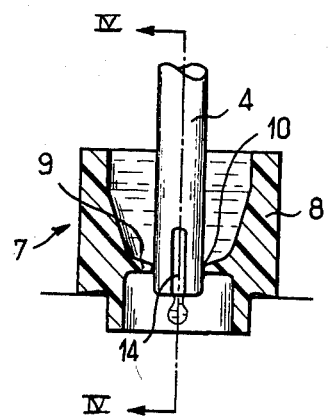
FIG. 3 is a sectional view of the nozzle and of the plunger in the injection position.

A longitudinal groove 14 is formed in the pintle 4 from the end remote from the push-rod 5. The groove 14 extends only over part of the length of the pintle 4. In the closed position as shown in FIGS. 1 and 2, the two ends of the groove 14 are located on one side of the lip 9. In the injection position as shown in FIGS. 3 and 4, the two ends of the groove 14 are located respectively on each side of the lip 9.

The push-rod 5 is guided in axial translational motion within a passage 15 formed in an end-wall 16 of a cylincrical housing 17 and in a passage 18 formed in a cover 19 of the housing 17. A spring 20 placed within the housing 17 is applied against the end-wall 16. By means of a cup 21 and a dowel-pin 22, said spring 20 exerts on the plunger 3 an axial force which tends to engage the groove 14 of the pintle 4 within the lip 9.

A control knob 23 is rigidly fixed to a jockey-piece 24 which traverses a wall 25 through an elongated orifice 26. Said jockey-piece 24 is pivotally mounted at 27 on that end of the push-rod 5 which is remote from the pintle 4 and is provided with a nose 28 which is applied against the wall 25 in the closed position under the combined action of the spring 20 and of a restoring spring 29.

In the injection position, the nose 28 is moved away from the wall 25, the dowel-pin 22 is applied against the cover 19 and the groove 14 is engaged within the lip 9, with the result that the ends of said groove 14 are located respectively on each side of said lip 9.

As shown more particularly in FIGS. 4 and 5, the passage provided for the flow of water into the vaporization chamber 12 is delimited on the one hand by the end of the groove 14 and on the other hand by the chord 9a which is described by the end of the lip 9 from one edge of the groove 14 to the other.

FIG. 6 shows the articulation 6 in greater detail. Said articulation comprises a spindle 30 carried by two lugs 31 of the push-rod 5. Said spindle 30 extends through the pintle 4 in which an orifice is formed for this purpose, said orifice being formed by two frusto-conical holes 32 disposed in head-to-head relation. The minimum cross-section of said orifice is substantially equal to that of the spindle 30 and located substantially at the center of said orifice. By virtue of said articulation 6, the pintle 4 is capable of orientation in all directions wih respect to the push-rod 5. Said articulation 6 therefore constitutes a knuckle-joint assembly.

The operation of the device as illustrated in the drawings is as follows:

In the closed position shown in FIGS. 1 and 2, the pintle 4 obturates the orifice 10 and the water cannot flow from the water reservoir 11 to the vaporization chamber 12.

If a user depresses the control knob 23 and causes this latter to pivot about the pin 27 so as to apply tension to the restoring spring 29, then releases said control knob 23, the nose 28 is disengaged from the wall 25 and the spring 20 causes upward displacement of the plunger 3 until the dowel-pin 22 is abuttingly applied against the cover 19. The plunger 3 is then in the injectin position and the two ends of the groove 14 are located respectively on each side of the lip 9. The water contained in the water reservoir 11 can then pass through the lip 9 by flowing along the groove 14 and fall drop by drop into the vaporization chamber 12.

In order to return the plunger 3 to the closed position, the user needs only press on the control knob 23 until the nose 28 engages beneath the wall 25 under the action of the restoring spring 29.

By virtue of the articulation 6, even if the passages 15 and 18 are not correctly aligned with the orifice 10, the pintle 4 will be capable of correctly sliding within the thin lip 9 while this latter undergoes slight elastic deformation.

FIGS. 7 to 13 show different alternative forms of construction of the pintle 4.

FIGS. 7 and 8 illustrate the pintle 4 as described in the foregoing. The groove 14 has a constant width along the axis and its depth is similar in value to its width, thus having a favorable effect on the flow of water by virtue of capillarity phenomena. The cross-section of the groove 14 is therefore constant and the flow rate of water will be substantially constant irrespective of the position of the groove 14 within the lip 9 on condition that the ends of said groove are located on each side of said lip.

FIGS. 9 to 11 illustrate a different version of the pintle as designated by the reference 104. Said pintle 104 is provided with a groove 114 which is subdivided into two portions 114a, 114b. The portion 114a had a smaller cross-section than the portion 114b so that, if the lip 9 encircles the pintle 104 at the level of the portion 114a, the flow rate of water is lower than if the lip 9 encircles the pintle 104 at the level of the portion 114b. The pintle 104 must therefore be associated with a control device (not shown in the drawings) which makes it possible to choose between these two injection positions and the closed position.

A pintle of this type therefore makes it possible to choose between two rates of steam delivery.

FIGS. 12 and 13 illustrate a third version of the pintle which is designated by the reference 204. The pintle 204 is provided with a groove 214 having a cross-section which decreases from the free end of said pintle 204.

It is thus apparent that, as the lip 9 encircles the pintle 204 nearer the free end of this latter, so the rate of flow of water into the vaporization chamber 12 is higher, and so the steam supplied by the vaporization chamber is in turn delivered at a higher rate.

Referring now to FIG. 14, elements which are identical with those of the previous figures are designated by the same references whereas modified or novel elements are designated by a reference above 300.

The water injection device 302 comprises a plunger 303 consisting of a pintle 304 of polytetrafluoroethylene and of a push-rod 305 of polypropylene. The pintle 304 and the push-rod 305 are pivotally coupled by means of an articulation 6.

A longitudinal groove 314 is formed in the pintle 304. The longitudinal groove 314 does not extend to the free end of the pintle 304.

In the closed position as shown in FIG. 14 and according to the invention, the two ends of the groove 314 are located on one side of the lip 9. In this position, however, the groove 314 is located within the water reservoir 11 instead of being located within the vaporization chamber 12 as was the case in the devices described with reference to FIGS. 1 to 13. The result thereby achieved is that, in the closed position, the lip 9 fits around the pintle 304 between the groove 314 and the free end of said pintle 304 whereas, in the versions described earlier, the lip 9 fits around the pintle 4, 104, 204 between the groove 14, 114, 214 and the articulation 6.

The groove 314 is constituted by two portions 314a, 314b having different cross-sections.

The push-rod 305 is guided in axial translational motion on the one hand by the passage 15 formed in the end-wall 16 of the cylindrical housing 17 and on the other hand by a cup 321 slidably mounted within the housing 17.

The spring 20 is mounted between the end-wall 16 and the cup 321 which is applied against the push-rod 305 by means of the dowel-pin 22. The housing 17 is closed by a cover 319 in which is formed an elongated passage 318. A control knob 323 is rigidly fixed to a jockey-piece 324 pivotally mounted at 27 on that end of the push-rod 305 which is remote from the pintle 304. The jockey-piece 324 is provided with two superposed noses 328a and 328b.

In the closed position shown in FIG. 14, the two noses 328a and 328b are located outside the housing 17.

In the slow-injection position, the lip 9 encircles the groove 314 at the level of the portion 314a which has the smallest cross-section and the nose 328a which is nearest the pintle 304 is applied against the cover 319 under the combined action of the spring 20 and of the restoring spring 29.

In the fast-injection position, the lip 9 encircles the groove 314 at the level of the portion 314b which has the largest cross-section and the other nose 328b is applied against the cover 319 under the combined action of the spring 20 and of the restoring spring 29.

By depressing the control knob 323 to a greater or lesser extent, the user can therefore choose between the closed position in which the injection of water is cut-off and two injection positions corresponding to two different rates of steam delivery.

In contrast to the versions illustrated in FIGS. 1 to 13 in which the position of maximum downward displacement of the control knob 23 corresponds to the closed position, the version illustrated in FIG. 14 is so arranged that the released position of the control knob 323 corresponds to the closed position.

The different embodiments of the invention as hereinabove described offer at least the following advantages:

the plunger never passes out of the orifice and there is therefore no problem involved in guiding the plunger with respect to the nozzle during operation; moreover, the cross-sectional area provided for the flow of water into the vaporization chamber remains constant throughout the service life of the iron;

since the plunger does not pass out of the nozzle, the orifice can therefore have a thin lip which provides a very tight seal and does not readily become incrusted with scale;

since the lip is of small thickness and the articulated plunger never escapes from this latter, the plunger does not need to be perfectly aligned with said lip at the time of assembly.

As can readily be understood, the invention is not limited to the examples given in the foregoing and many arrangements or modifications can be made in these examples without thereby departing either from the scope or the spirit of the invention.

From this it accordingly follows that the control device can be designed in any suitable manner so that the plunger may be selectively maintained in a rest position and in one or a number of injection positions. In particular, and especially in the case of the groove whose cross-section varies continuously along the pintle as illustrated in FIGS. 12 and 13, the control operation can be performed by means of a screw-type system in which the screw is coaxial with the plunger.

In the embodiment shown in FIGS. 1 to 13, the groove does not necessarily have its opening at the end of the pintle and may stop short of said end.

The pintle of the injection device shown in FIG. 14 can be provided with a groove having a constant cross-section, in which case said device will provide a choice only between a rest position and a single injection position. On the contrary, the device may be provided with a groove having a cross-section which varies continuously and permits a choice between a rest position and an injection position providing a continuously adjustable rate of steam delivery. It is readily apparent that, in each case, the control device is adapted so as to permit the utilization of these different forms of groove.

The push-rod 5, 305, can be fabricated from any suitable low-cost material.

The pintle 4, 104, 204, 304 and the lip 9 can each be fabricated from any material having the properties required for their operation. These properties primarily consist of good resistance to high temperature and to scale formation as well as a sufficient degree of elasticity in the case of the lip 9.

What is claimed is:

1. A water injection device for a steam iron, comprising a plunger adapted to be moved axially over a predetermined range of travel within the orifice of a nozzle formed of elastic material and adapted to encircle said plunger in closely fitting relation thereto, the nozzle orifice being substantially coaxial with the plunger and intended to provide a communication between a water reservoir and a vaporization chamber, a longitudinal groove being formed along part of the length of the plunger, the range of travel of said plunger being such that the two ends of said groove are located on each side of the orifice in a first end position and that the two ends of said groove are located on one side of said orifice in a second end position in which second end position said plunger closes said orifice, wherein the nozzle comprises an annular portion of elastic material, a thin lip being formed on the internal wall of said annular portion in order to delimit the orifice of said nozzle, said nozzle and plunger being in contact with each other in both of said positions.

2. A device according to claim 1, wherein the plunger is constituted by two portions pivotally coupled together by means of a knuckle-joint assembly.

3. A device according to claim 2, wherein the knuckle-joint assembly comprises a pivot-pin carried by one portion of the plunger, an orifice for said pivot-pin being provided in the other portion of said plunger and formed by two frusto-conical holes disposed in head-to-head relation, the smallest cross-sectional area of the orifice located at the center of said orifice being substantially equal to the cross-sectional area of the pivot-pin aforementioned.

4. A device according to claim 2 or claim 3, wherein only that portion of the plunger which cooperates with the nozzle is formed of material which affords resistance primarily to scale formation and to high temperatures.

5. A device according to claim 1, wherein the cross-section of the groove varies along the axis as a function of the law of flow adopted.

6. A device according to claim 1, wherein the groove extends to that end of the plunger which is located within the vaporization chamber and wherein the control means comprise a lever adapted to produce action on the other end of said plunger.

7. A device according to claim 1, wherein the groove stops short of that end of the plunger which is located within the vaporization chamber, wherein in the second end position, the nozzle encircles the plunger between the groove and the aforementioned end of said plunger and wherein control means comprise a lever adapted to produce action on the other end of said plunger.

8. A steam iron comprising a water reservoir adapted to communicate with a vaporization chamber through a nozzle closely fitted around a plunger associated with control means, said plunger being capable of axial displacement over a predetermined range of travel, a longitudinal groove being formed along part of the length of the plunger, the range of travel of said plunger being such that the two ends of the groove are located on each side of the orifice in a first end position and that the two ends of the groove are located on one side of said orifice in a second end position in which second end position said plunger closes said orifice, wherein the nozzle comprises an annular portion of elastic material, a thin lip being formed on the internal wall of said annular portion in order to delimit the orifice of said nozzle, said nozzle and plunger being in contact with each other in both of said positions.

* * * * *